(No Model.)
C. C. MAXWELL.
LAWN MOWER ATTACHMENT.
No. 448,977. Patented Mar. 24, 1891.
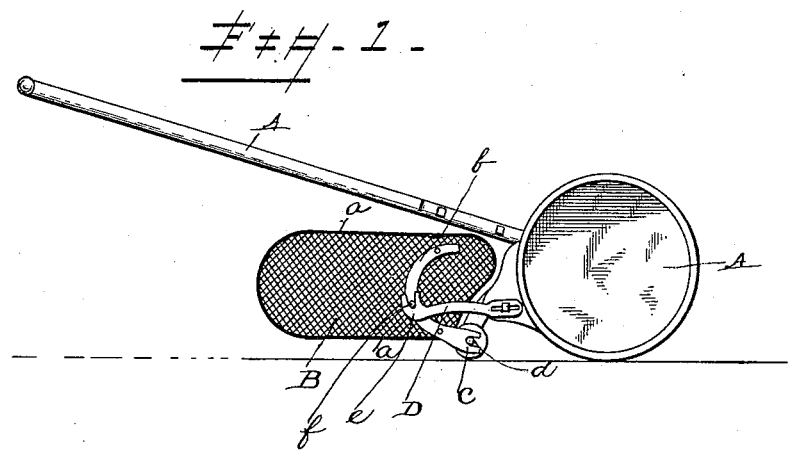
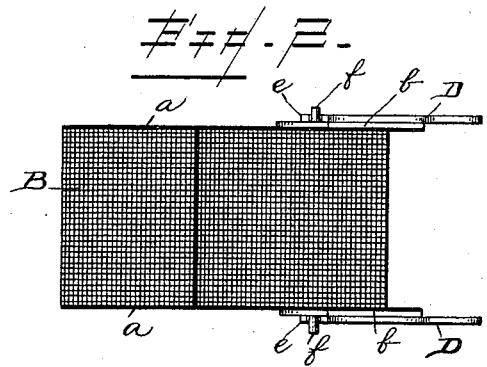
Witnesses
Albert B. Blackwood
Jos. H. Blackwood
Inventor
Charles C. Maxwell
by J. Clement Smith & Co.
his Attorneys

UNITED STATES PATENT OFFICE.

CHARLES C. MAXWELL, OF WATERTOWN, SOUTH DAKOTA.

LAWN-MOWER ATTACHMENT.

SPECIFICATION forming part of Letters Patent No. 448,977, dated March 24, 1891.

Application filed December 19, 1890. Serial No. 375,187. (No model.)

*To all whom it may concern:*

Be it known that I, CHARLES C. MAXWELL, a citizen of the United States, residing at Watertown, in the county of Coddington and State of South Dakota, have invented certain new and useful Improvements in Lawn-Mower Attachments; and I do declare the following to be a full, clear, and exact description of the invention, such as will enable others skilled in the art to which it appertains to make and use the same.

My invention relates to certain new and useful improvements in attachments for lawn-mowers; and the nature of the invention will be understood from the folloiwng description, when taken in connection with the accompanying drawings, in which—

Figure 1 is a side elevation of a lawn-mower with my attachment in position, and Fig. 2 a top elevation of the invention.

The object of the invention is to provide an attachment by the use of which the grass cut by the mower will be collected in a suitable receptacle instead of being deposited on the lawn, thus saving the lawn and making the collection of the cut grass more convenient.

In the drawings I have marked with the reference-letter A all those parts of the mower which are common and well known, and will refer to the mower generally by such reference-letter.

B represents a basket, which may be formed of any suitable material—such as woven wire, sheet metal, &c.—such basket being reenforced and strengthened by means of bands $a$, secured thereto in the manner and at the points shown. Secured to each side of this basket by means of rivets or otherwise is a curved arm $b$, which at its lower forward ends is forked, as shown at $c$, these fork-shaped ends being arranged to fit around the ends of the spindle $d$, upon which the rollers of the mower are mounted.

D D are arms, one of which is secured to each side of the mower-frame, and the rear end of each of which is forked, as at $e$, and arranged to engage pintles $f$, secured to arms $c$. The arrangement of the basket with respect to the mower is such that the former does not impede the operation of the latter.

What I claim is—

The combination, with mower A and forked arms D, of basket B, forked arms $b$, and pintles $f$, as set forth.

In testimony whereof I affix my signature in presence of two witnesses.

CHARLES C. MAXWELL.

Witnesses:
OLIVER H. TARBELL,
JOHN S. GRIFFIN.